3,736,135
METHOD OF INCREASING IMAGE CONTRAST
Roy H. Stratton, Woodland Hills, Calif., assignor to The Rand Corporation, Santa Monica, Calif.
Filed Sept. 7, 1971, Ser. No. 178,092
Int. Cl. G03c 5/08, 7/00
U.S. Cl. 96—23                                  10 Claims

ABSTRACT OF THE DISCLOSURE

A method of increasing the visual contrast of photographs having various low contrast areas, such as X-ray plates, aerial photographs, etc. By this process, the various shades of grey are converted to various colors which can be more easily distinguished by the eye.

SUMMARY OF THE INVENTION

This invention relates to the increase or enhancement of contrast in a picture having areas of little contrast. The process finds use in many fields, but it is of particular value in the field of medical roentgenology or X-ray pictures, and in the field of aerial photography and reconnaissance. In each case, there is a very good possibility that very important information is recorded on the film in the form of areas of very slight difference in density or light transmission, and this information can only be retrieved if the areas of similar but slightly different light transmission can be defined. Thus, in the case of certain X-rays, where it is thought that a patient may have cancer, the resulting X-ray picture may be extremely difficult to interpret because the transmission of cancerous and non-cancerous tissue is substantially the same.

Similarly, in the case of interpretation of aerial photographs, two areas may be recorded as only very slightly different shades of grey, and the visual interpretation of such a photograph will be hampered by the similarity of the two shades.

Under what amounts to substantially ideal conditions, the human eye can discern and differentiate between approximately twenty different grey levels. Since the eye can distinguish many more colors under such circumstances, it is possible to secure much more information from such an image by transforming the grey scale into a chromatic scale. Such a conversion is referred to as a pseudocolor transformation and results in each different intensity level, or shade of grey, being represented as a different color in the finished picture. The process briefly includes the exposure of a color film to light of two different colors, one color being transmitted through a positive record and the other being transmitted through a negative record.

While lights of only two different colors are used, a full range of spectral colors is secured. However, it is to be understood that the resulting colors may, and probably will, have no relationship whatsoever to the normal colors of the subject.

DETAILED DESCRIPTION

In many uses of photography, it is important to be able to differentiate between adjacent areas of the film where the only difference is the light transmission of these areas. As previously indicated, X-ray photographs are an example of a case in which the film or plate is viewed by transmitted light and the differences in transmission caused by the differences in silver present in the emulsion form a record of the object that is the subject of the X-ray. By its very nature, an X-ray photograph is essentially monochromatic, and even if color film were substituted for the usual black and white film, the resulting picture would still be essentially monochromatic.

Figure 2:
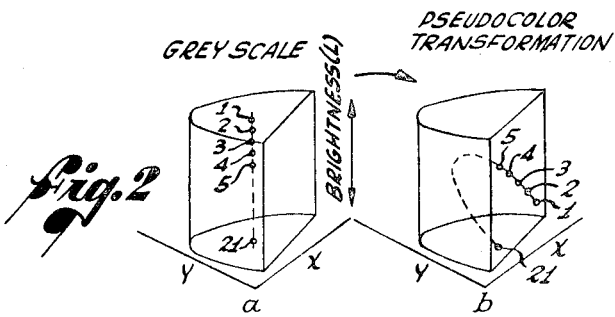
FIG. 2 is a diagram indicating the pseudocolor transformation in the CIE chromaticity diagram from the grey scale in (a) to the chromatic equivalent in (b)
Figure 3:
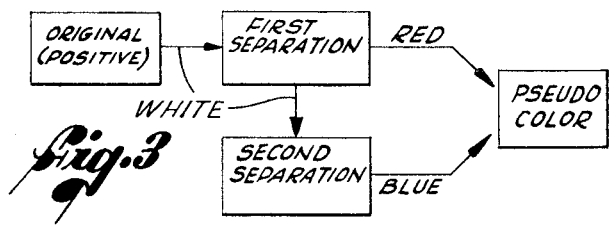
FIG. 3 is a flow diagram indicating the method of securing a pseudocolor print.

It is very difficult to detect and outline the areas of very slightly different transmission, since the human eye at best can probably detect no more than about twenty different shades of grey. As indicated in FIG. 2(a) the differences in transmission on a grey scale are represented by a single achromatic line in the CIE space. If the approximately twenty different shades of grey are represented by the numbers 1 through 21, with the number 1 indicating the lightest or whitest shade, and the numeral 21 indicating the darkest, it will be apparent that the ability of the eye to detect differences in the color of the light is not used. By converting the differences in density to simultaneous differences in color and density, as indicated in FIG. 2(b), it will be seen that the various shades of grey are now converted to various colors, and the eye is better able to separate these differences. Thus, the lightest area in the original may be reproduced in red, and the darkest part may be reproduced as blue, with intermediate hues of orange, yellow, green and cyan. The change from the grey scale of FIG. 2(a) to the colored representation of FIG. 2(b) is termed a pseudocolor transformation, and it will be appreciated that the resulting colors will not necessarily have any relationship whatsoever to the colors of the original subject, but indicate only differences in the light transmission of the original black and white picture.

To effect the pseudocolor transformation, the original picture, which may be considered a positive, is copied to provide a suitably sized transparency with a proper density range. This copy, which may be considered the first separation print, is then used to make a second separation print by making a contact print from the first separation print, with the films so placed that they are not placed emulsion-to-emulsion, so that the resulting images, while in negative and positive form, are not mirror images of each other. These separation prints are made on a black and white film capable of moderately high contrast, suitable for copying continuous tone images.

The first and second separation prints are then contact printed on a color negative film. The first separation print is first placed on the color negative film, emulsion-to-emulsion, and printed with a red light source, and the second separation print is then placed on the color negative film where the first separation print was and in register with the latent image of the first separation print, and the second separation print is then contact printed, emulsion-to-emulsion, with a blue light source. The second separation print is then removed and the color film is processed.

By way of example, the separation films may be Eastman Kodak Commercial, or Eastman Kodak CPO film, the negative color material may be Eastman Ektacolor film, and the printing light source may be a 150 watt Tungsten enlarging lamp operating at 2950° K. The red filter for that lamp may be a Wratten Gelatin Filter No. 23A and the blue filter a Wratten No. 47A. In this connection, it is well to note that the printing of the second separation print with the blue light source requires an exposure time approximately two and one-half times the exposure of the first separation print with the red light source.

Figure 4:
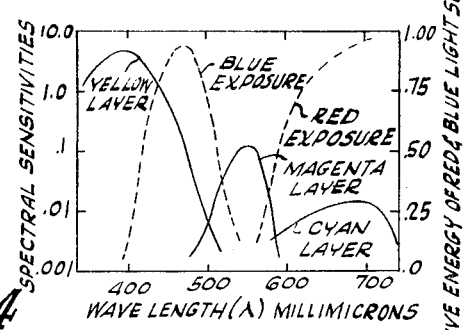
FIG. 4 is a graph showing the sensitivity of the various emulsions in the color film and the energy distribution of the color light sources.

The color negative film is one having a plurality of superimposed emulsions with appropriate filters and sensitivities, and in FIG. 4, there are illustrated the relative sensitivities of the three different emulsions and, superimposed on the same graph, the relative energy in various portions of the spectrum of the red and blue light sources. Considering first the emulsion layers, it will be noted that a yellow layer, a magenta layer and a cyan layer are shown on the graph. The yellow layer is primarily sensitive to blue light, the magenta layer is primarily sensitive to green light, and the cyan layer is primarily sensitive to red light. The names "yellow," "magenta" and "cyan" refer to the colors of the images formed in the respective layers and from a study of this graph, it will be appreciated that the yellow layer is substantially unaffected by exposure to the red light, and the cyan layer is substantially unaffected by exposure to the blue light. The magenta layer is affected by exposure to the red light, and to the blue light, and to any combinations of the two.

If it is now assumed that the image shown in FIG. 1(a) is to be subjected to a pseudocolor transformation, the first step in making the finished pseudocolor print is the making of the first separation print which will produce an image, such as shown in FIG. 1(c) in which the gradations of FIG. 1(a) are reversed, and the negative of (a) is produced. From this first separation print a second separation print is then made which is substantially a duplicate of that shown in FIG. 1(a). The first separation print is then printed by red light onto the color negative material and it will be recognized that the darkest area of 1(c), corresponding to the lightest area of 1(a), will transmit substantially no red light to expose the cyan layer. Similarly, the clear area of FIG. 1(c) corresponding to the darkest area of FIG. 1(c) will transmit substantially all of the red light and will hence provide the maximum exposure for the cyan layer and some exposure of the magenta layer. The intermediate area will transmit intermediate amount of red light and provide corresponding intermediate exposures of the cyan and megenta layers.

Figure 1:
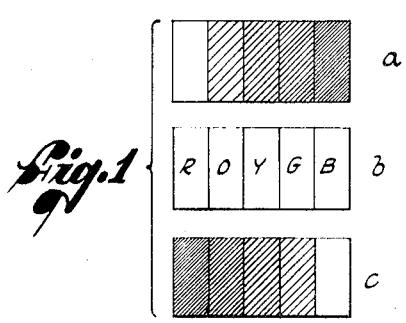
FIG. 1 is a schematic representation showing in (a) areas of various shades of grey; the corresponding colors in (b); and the reverse or negative of (a) in (c)

When the second separation print corresponding to FIG. 1(α) is then printed by blue light onto the color negative material, the clear area of FIG. 1(a) will permit the blue light to expose the yellow layer and partially expose the magenta layer, while the darkest area of FIG. 1(a) will point permit any appreciable amount of yellow light to pass and hence there will be no appreciable exposure of the yellow or magenta layers. Again, intermediate areas will permit intermediate amounts of the blue light to pass.

The area in the color film corresponding to the clear area of FIG. 1(a) thus has its yellow layer and magenta layer colored, and the combination of these two layers will transmit red light through the pseudocolor print. At the same time, the area corresponding to the darkest area in FIG. 1(a), the lightest area in FIG. 1(c), will have the cyan and magenta layers exposed and this will provide a blue color. Intermediate densities in FIG. 1(a) will provide different exposures for the different emulsions, and the whole gamut of the spectrum can be produced in the pseudocolor print.

Figure 5:
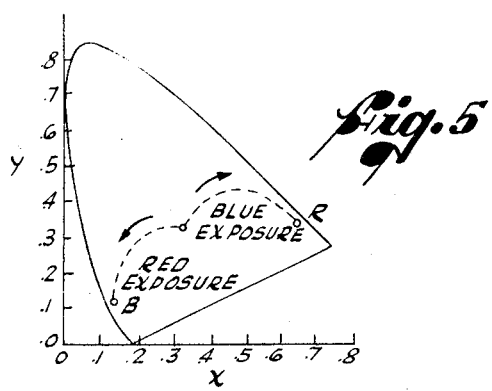
FIG. 5 is a diagram illustrating the chromaticity changes with increasing exposure to the different light sources.
Figure 7:
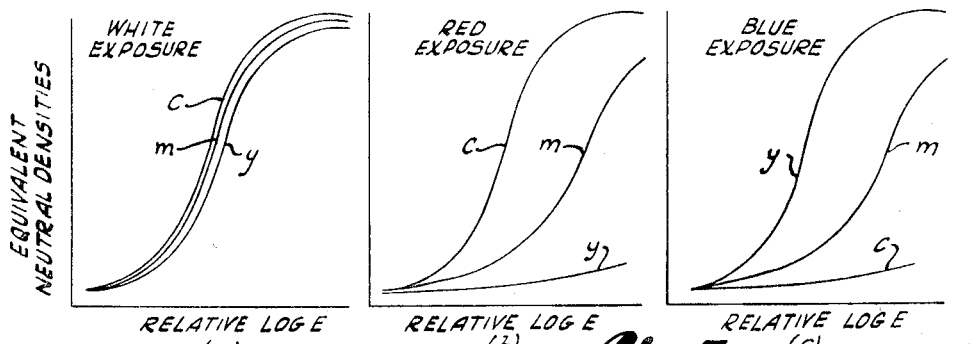
FIG. 7 is a series of density-exposure curves for negative color material when exposed to white, red, and blue light sources.

It will be apparent to those familiar with photographic sensitivities that the spectral sensitivity curves of FIG. 4 are not true for all exposure values. In FIG. 7 there are shown the corresponding sensitivity curves for exposure of the emulsions to the white light source for which the material is balanced, to the red light source previously mentioned, and to the blue light source previously mentioned. These curves show the equivalent neutral density, or D, plotted against a logarithm of the relative exposure E. These curves which are known as $D \log E$ curves, show that when the film is exposed to white light, the $c$, $m$ and $y$, or cyan, magenta and yellow emulsions have very similar and almost superimposed curves. When the same emulsions are exposed to the red light, the cyan emulsion maintains substantially its same shape and value, but the magenta emulsion has a more gradual slope, and the yellow emulsion has a very flat slope and is almost unaffected. When exposed to the blue light source, the yellow emulsion maintains substantially the sensitivity that it had in the white light exposure, the magenta emulsion has a sensitivity generally similar to that of the magenta layer when exposed to red light, and the cyan layer is very flat and has almost no sensitivity to the blue light. As a result of these different sensitivities, it is possible to change the spectral hue of the pseudocolor print by the amount of exposure to either the red, or the blue light. Thus, as the exposure to the red light increases, the resulting color will change from substantially saturated cyan to a blue as the proportion of cyan to magenta changes. Similarly, as the exposure to blue light is increased, the first color is substantially yellow and then as the proportion of magenta increases, the hue shifts through orange and finally to red. This means that with only a single exposure to the red light, it is possible to secure blue and cyan hues on the finished print, and with only a single exposure to the blue light, it is possible to secure yellow, orange and red on the final print. These changes are indicated in the CIE diagram of FIG. 5.

Figure 6:
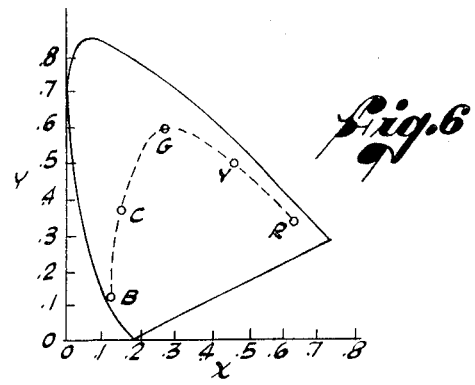
FIG. 6 is a similar diagram illustrating the range of colors that are possible in the resulting print.

In order to obtain a green image, it is necessary to increase the density of the cyan and yellow images, while keeping the density of the magenta image at a minimum. This can be done by exposing to both the red and blue light sources to a degree where the ratio of the cyan and the yellow images to the magenta image is very high. In FIG. 6, point G on the curve indicates the resulting green image, and it can be shown that by using various combinations of red and blue exposures, the gamut of spectral hues shown on the dotted line of FIG. 6 can be obtained.

It is possible to interchange the colors of the lights used for the printing of the first and second separation prints, so that the first separation is printed with the blue light and the second separation is printed with the red light. This would result in an apparent reversal of the colors of the image formed on the pseudocolor print, and would sometimes be useful in attempting to separate areas of different density falling near the red or blue end of the spectrum. If the first and second separation prints are balanced and are of the proper density, the full gamut of the spectrum should be produced with either the previously described or reverse method of printing.

It is apparent that the first and second separation prints must be of the proper quality to produce the best results, and generally this requires that the range of the densities of the prints be from 0.5 to 3.0. Additionally, to the extent possible, the exposure should be on the straight line portion of the $D \log E$ sensitivity curve without including either or both of the toe or knee of the curve. The securing of the proper exposure time and the proper density range are matters that can be achieved by customary photo practices.

It is possible to provide pseudocolor prints by other means, such as by a system in which an original picture is scanned by a photocell and the output of that photocell is fed into a computer which then prints out color separation images that, through appropriate means, can be used to produce a so-called three-color image. A photographic process can be used in which intermediate masks are produced by photographic means to convert the original grey scale into three pseudocolor separation positives or negatives, for either additive color projection or for triple-filter exposure on color material to render a transparency or a print. These systems are more complicated and require a higher degree of ability on the part of the operators, than the presently described two-color pseudocolor transformation. The present system has the advantage of providing a permanent image of high quality which can be produced rapidly in a modestly equipped photo laboratory. Consequently, the benefits of image enhancement and the resulting increase in information are more readily available to those who need such information.

While a preferred method of practicing the invention has been set forth, it will be apparent that modifications can be made by those skilled in the art, and hence the invention is not to be restricted to the particular steps or sequence set forth, except as limited by the following claims.

I claim:
1. The method of increasing the visual contrast of a monochromatic image which includes the steps of:
   providing photographic positive and negative images of said image;
   printing said positive image on a multi-emulsion color film by a first light source that principally exposes a first emulsion of said color film and to a lesser degree exposes a second emulsion of said color film;
   printing said negative image on said color film in register with the image thereon produced by said positive image, said negative image being printed by a second light source that principally exposes a third emulsion of said color film and to a lesser degree exposes said second emulsion of said color film; and
   processing said color film.

2. The method of claim 1 in which said first and second light sources pass substantially mutually exclusive portions of the visible spectrum.
3. The method of claim 1 in which said first light source is blue and said second light source is red.
4. The method of claim 1 in which the spectral transmissions of said emulsions are such that the full spectral range of hues from blue to red can be obtained by appropriately proportioned exposures.
5. The method of claim 4 in which said first and second light sources pass substantially mutually exclusive portions of the visible spectrum.
6. The method of claim 4 in which said first light source is blue and said second light source is red.
7. The method of claim 1 in which said first emulsion provides a yellow image, said second emulsion provides a magenta image, and said third emulsion provides a cyan image.
8. The method of claim 7 in which said first and second light sources pass substantially mutually exclusive portions of the visible spectrum.
9. The method of claim 7 in which said first light source is blue and said second light source is red.
10. The method of claim 1 in which both said positive and negative images have a density range of 0.5 to 3.0.

References Cited
UNITED STATES PATENTS

| | | | |
|---|---|---|---|
| 2,270,749 | 1/1942 | Ball | 96—17 |
| 2,407,211 | 9/1946 | Yule | 96—44 |

NORMAN G. TORCHIN, Primary Examiner

A. T. SURO PICO, Assistant Examiner

U.S. Cl. X.R.

96—27 H, 44